United States Patent
Hennessy

(10) Patent No.: US 7,265,456 B2
(45) Date of Patent: Sep. 4, 2007

(54) POWER GENERATION SYSTEM INCORPORATING A VANADIUM REDOX BATTERY AND A DIRECT CURRENT WIND TURBINE GENERATOR

(75) Inventor: Timothy D. J. Hennessy, Portland, OR (US)

(73) Assignee: VRB Bower Systems Inc., Vancouver, British Columbia (CA)

( * ) Notice: Subject to any disclaimer, the term of this patent is extended or adjusted under 35 U.S.C. 154(b) by 0 days.

(21) Appl. No.: 11/035,922

(22) Filed: Jan. 14, 2005

(65) Prior Publication Data

US 2005/0156432 A1 Jul. 21, 2005

Related U.S. Application Data

(60) Provisional application No. 60/536,664, filed on Jan. 15, 2004.

(51) Int. Cl.
- *F02B 63/04* (2006.01)
- *F03D 9/00* (2006.01)
- *H02P 9/04* (2006.01)

(52) U.S. Cl. ............ 290/44; 290/55; 290/1 R
(58) Field of Classification Search ........... 290/55, 290/44; 415/7, 2.1, 4.2, 4.3, 4.5, 907, 908; 416/1
See application file for complete search history.

(56) References Cited

U.S. PATENT DOCUMENTS

| | | | |
|---|---|---|---|
| 3,530,003 A | 9/1970 | Warszawski et al. | |
| 3,996,064 A | 12/1976 | Thaller | 320/2 |
| 4,362,791 A * | 12/1982 | Kaneko et al. | 429/101 |
| 4,786,567 A | 11/1988 | Skyllas-Kazacos et al. | 429/19 |
| 4,797,566 A * | 1/1989 | Nozaki et al. | 307/43 |
| 4,956,244 A * | 9/1990 | Shimizu et al. | 429/17 |
| 5,225,712 A * | 7/1993 | Erdman | 290/44 |
| 5,250,158 A | 10/1993 | Kaneko et al. | 204/86 |
| 5,318,865 A | 6/1994 | Kaneko et al. | 429/193 |
| 5,368,762 A | 11/1994 | Sato et al. | 252/62.2 |
| 5,512,787 A * | 4/1996 | Dederick | 290/4 R |
| 5,587,132 A | 12/1996 | Nakajima et al. | 423/62 |
| 5,656,390 A | 8/1997 | Kageyama et al. | 429/44 |

(Continued)

FOREIGN PATENT DOCUMENTS

| | | |
|---|---|---|
| WO | WO 95/12219 | 5/1995 |
| WO | WO 03/092109 A1 | 11/2003 |

OTHER PUBLICATIONS

Bartolozzi, M., "Development of Redox Flow Batteries. A Historical Bibliography," Journal of Power Sources, 27 (1989), pp. 219-234.

(Continued)

*Primary Examiner*—Julio Gonzalez
(74) *Attorney, Agent, or Firm*—John R. Thompson; Stoel Rives LLP

(57) ABSTRACT

A power generation system includes a wind turbine generator and a vanadium redox battery to compensate for fluctuations in wind power. The wind turbine generator provides DC power that may be used to charge the vanadium redox battery. Generated DC power may also be used for power distribution and, if required, supplemented by DC power from the vanadium redox battery. The power generation system interfaces with a control system to optimize performance and efficiency.

15 Claims, 4 Drawing Sheets

U.S. PATENT DOCUMENTS

| | | | | |
|---|---|---|---|---|
| 5,665,212 | A | 9/1997 | Zhong et al. | 304/297 R |
| 5,759,711 | A | 6/1998 | Miyabayashi et al. | 429/15 |
| 5,851,694 | A | 12/1998 | Miyabayashi et al. | 429/105 |
| 6,143,443 | A | 11/2000 | Kazacos et al. | 429/204 |
| 6,461,772 | B1 | 10/2002 | Miyake et al. | 429/247 |
| 6,468,688 | B2 | 10/2002 | Kazacos et al. | 429/101 |
| 6,562,514 | B1 | 5/2003 | Kazacos et al. | 429/204 |
| 6,563,234 | B2 * | 5/2003 | Hasegawa et al. | 307/66 |
| 6,613,298 | B2 | 9/2003 | Tanaka et al. | 423/62 |
| 6,761,945 | B1 | 7/2004 | Adachi et al. | 428/36.1 |
| 6,764,789 | B1 | 7/2004 | Sekiguchi et al. | 429/105 |
| 6,809,431 | B1 * | 10/2004 | Schippmann | 290/55 |
| 2004/0191623 | A1 * | 9/2004 | Kubata et al. | 429/189 |
| 2005/0074665 | A1 * | 4/2005 | Spaziante et al. | 429/50 |
| 2005/0147871 | A1 * | 7/2005 | Shigematsu et al. | 429/50 |

OTHER PUBLICATIONS

Sum, et al., "A Study of the V(II)/V(III) Redox Couple for Redox Flow Cell Applications," Journal of Power Sources, 15 (1985), pp. 179-190.

Skyllas-Kazacos et al., "Characteristics and performance of 1 kW UNSW vanadium redox battery," Journal of Power Sources, 35 (1991) pp. 399-404.

Skyllas-Kazacos, et al., "Vanadium redox battery prototype: design & development," University of New South Wales, Department of Minerals and Energy, Jan. 1991, 254 pgs.

Kazacos, Michael, "Electrolyte Optimization and Electrode Material Evaluation for the Vanadium Redox Battery," a thesis submitted as part of the requirements for the degree of Master of Science, School of Chemical Engineering and Industrial Chemistry, The University of New South Wales, Feb. 1989, 250 pgs.

Skyllas-Kazacos, et al., "Development of Redox Cell for Remote Area Energy Storage," School of Chemical Engineering & Industrial Chemistry, University of New South Wales, 200 pgs.

Skyllas-Kazacos, et al., "Development of Redox Cell for Remote Area Energy Storage," School of Chemical Engineering & Industrial Chemistry, University of New South Wales, 200 pgs, no date provided.

* cited by examiner

POWER GENERATION SYSTEM INCORPORATING A VANADIUM REDOX BATTERY AND A DIRECT CURRENT WIND TURBINE GENERATOR

RELATED APPLICATIONS

This application claims priority to U.S. patent application Ser. No. 60/536,664 filed on Jan. 15, 2004, and titled "Power Generation System Incorporating a Vanadium Redox Battery Energy Storage System and Wind Turbine."

TECHNICAL FIELD

This invention relates to power generators and battery storage systems, and more specifically, to wind turbine generators and vanadium redox battery systems.

BACKGROUND OF THE INVENTION

Domestic and industrial electric power is generally provided by thermal, hydroelectric, and nuclear power plants. New developments in hydroelectric power plants are capable of responding rapidly to power consumption fluctuations, and their outputs are generally controlled to respond to changes in power requirements. However, the number of hydroelectric power plants that can be built is limited to the number of prospective sites. Thermal and nuclear power plants are typically running at maximum or near maximum capacity. Excess power generated by these plants can be stored via pump-up storage power plants, but these require critical topographical conditions, and therefore, the number of prospective sites is determined by the available terrain.

New technological innovations and ever increasing demands in electrical consumption have made wind power plants a viable option. The power output from an individual wind turbine generator or set of wind turbine generators varies as a function of wind speed. Wind speed is stochastic in nature and varies by hour, by day, by season and by year, and this reduces the availability or firmness of the resource. The power output cannot be dispatched, and its value is therefore discounted. DC wind turbine generators have advantages over AC wind turbine generators in that they are less expensive, lighter, and require less maintenance.

Vanadium redox batteries (VRBs) have recently received favorable attention, as they promise to be inexpensive and possess many features that provide for long life, flexible design, high reliability, and low operation and maintenance costs. A VRB includes cells holding anolyte and catholyte solutions separated by an energy conversion mechanism. VRBs rely on a pumping flow system to pass the anolyte and catholyte solutions through the cells. In operating a VRB, flow rates, internal temperatures, pressure, charging and discharging times are all factors that influence power output.

VRBs can increase power availability and enhance the value and price that can be charged for wind energy. VRBs provide power output to support machine generators and receive excess power to enable charging. A VRB has a unique 1 to 1 charge-discharge response allowing the VRB to absorb energy from wind gusts and thus smooth out the wind power supply. This allows "spillage" of wind energy in wind turbine generators to be reduced to zero and simplifies the control of the blade pitch angles and yaw control of the wind turbine generator and allows the turbine generator to continuously operate at maximum speed.

Thus, it would be an advancement in the art to provide a stable and constant power output from a wind turbine generator by employing the benefits of a VRB.

BRIEF DESCRIPTION OF THE DRAWINGS

A more particular description of the invention briefly described above will be rendered by reference to the appended drawings. Understanding that these drawings only provide information concerning typical embodiments of the invention and are not therefore to be considered limiting of its scope, the invention will be described and explained with additional specificity and detail through the use of the accompanying drawings, in which.

DETAILED DESCRIPTION OF PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention. Specific examples are given to illustrate aspects of the invention, but those of skill in the relevant art(s) will understand that other examples may also fall within the meaning of the terms used, and hence within the scope of one or more claims. Important terms may be defined, either explicitly or implicitly, here in the Detailed Description and/or elsewhere in the application file.

Figure 1:
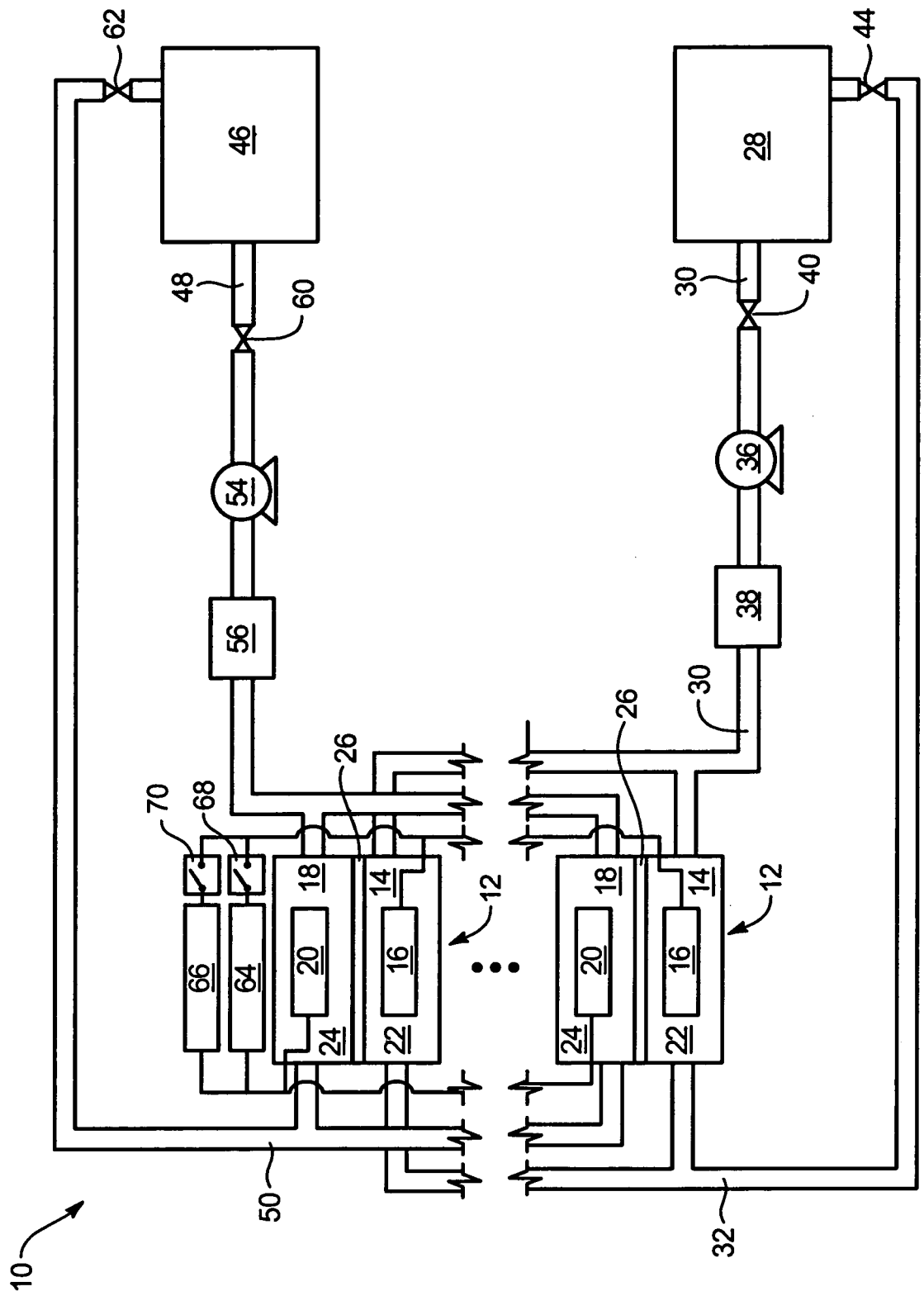
FIG. 1 is a block diagram of an embodiment of a VRB.

Referring to FIG. 1, a block diagram of a VRB-ESS 10 for use with the present invention is shown. A suitable energy storage system is required for remote power system applications that are supplied by either photovoltaic arrays or wind turbine generators. For such applications, low life-cycle cost and simplicity of operation are major requirements.

The system 10 includes one or more cells 12 that each have a negative compartment 14 with a negative electrode 16 and a positive compartment 18 with a positive electrode 20. Suitable electrodes include any number of components known in the art and may include electrodes manufactured in accordance with the teachings of U.S. Pat. No. 5,665,212, which is hereby incorporated by reference. The negative compartment 14 includes an anolyte solution 22 in electrical communication with the negative electrode 16. The anolyte solution 22 is an electrolyte containing specified redox ions which are in a reduced state and are to be oxidized during the discharge process of a cell 12 or are in an oxidized state and are to be reduced during the charging process of a cell 12 or which are a mixture of these latter reduced ions and ions to be reduced. The positive compartment 18 contains a catholyte solution 24 in electrical communication with the positive electrode 20. The catholyte solution 24 is an electrolyte containing specified redox ions which are in an oxidized state and are to be reduced during the discharge process of a cell 12 or are in a reduced state and are to be oxidized during the charging process of the cell 12 or which are a mixture of these oxidized ions and ions to be oxidized.

The anolyte and catholyte solutions 22, 24 may be prepared in accordance with the teachings of U.S. Pat. Nos. 4,786,567, 6,143,443, 6,468,688, and 6,562,514, which are hereby incorporated by reference, or by other techniques well known in the art. The anolyte solution 22 refers to an electrolyte containing specified redox ions which are in a reduced state and are to be oxidized during the discharge process of a redox battery or are in an oxidized state and are to be reduced during the charging process of a redox battery or which are a mixture of these latter reduced ions and ions to be reduced. The catholyte solution 24 refers to an electrolyte containing specified redox ions which are in an oxidized state and are to be reduced during the discharge process of a redox battery or are in a reduced state and are to be oxidized during the charging process of the redox battery or which are a mixture of these oxidized ions and ions to be oxidized. Further, aqueous NaOH is not included within the scope of anolyte solution 22, and aqueous HCl is not included within the scope of a catholyte solution 24. In one embodiment, the anolyte solution 22 is 1M to 6M $H_2SO_4$ and includes a stabilizing agent in an amount typically in the range of from 0.1 to 20 wt % and the catholyte solution 24 is 1M to 6M $H_2SO_4$.

Each cell 12 includes an ionically conducting separator 26 disposed between the positive and negative compartments 14, 18 and in contact with the catholyte and anolyte solutions 22, 24 to provide ionic communication therebetween. The separator 26 serves as a proton exchange membrane and may include a carbon material which may or may not be purflomatorated.

Additional anolyte solution 22 is held in an anolyte reservoir 28 that is in fluid communication with the negative compartment 14 through an anolyte supply line 30 and an anolyte return line 32. The anolyte reservoir 28 may be embodied as a tank, bladder, or other container known in the art. The anolyte supply line 30 communicates with a pump 36 and a heat exchanger 38. The pump 36 enables fluid movement of the anolyte solution 22 through the anolyte reservoir 28, supply line 30, negative compartment 14, and return line 32. The pump 36 has a variable speed to allow variance in the generated flow rate. The heat exchanger 38 transfers generated heat from the anolyte solution 22 to a fluid or gas medium. The pump 36 and heat exchanger 38 may be selected from any number of known, suitable devices.

The supply line 30 includes one or more supply line valves 40 to control the volumetric flow of anolyte solution. The return line 32 communicates with a return line valves 44 that controls the return volumetric flow. Similarly, additional catholyte solution 24 is held in a catholyte reservoir 46 that is in fluid communication with the positive compartment 18 through a catholyte supply line 48 and a catholyte return line 50. The catholyte supply line 48 communicates with a pump 54 and a heat exchanger 56. A variable speed pump 54 enables flow of the catholyte solution 22 through the catholyte reservoir 46, supply line 48, positive compartment 18, and return line 50. The supply line 48 includes a supply line valve 60 and the return line 50 includes a return line valve 62.

The negative and positive electrodes 16, 20 are in electrical communication with a power source 64 and a load 66.

A power source switch 68 is disposed in series between the power source 64 and each negative electrode 16. Likewise, a load switch 70 is disposed in series between the load 66 and each negative electrode 16. One of skill in the art will appreciate that alternative circuit layouts are possible and the embodiment of FIG. 1 is provided for illustrative purposes only.

In charging, the power source switch 68 is closed and the load switch is opened. Pump 36 pumps the anolyte solution 22 through the negative compartment 14 and anolyte reservoir 28 via anolyte supply and return lines 30, 32. Simultaneously, pump 54 pumps the catholyte solution 24 through the positive compartment 18 and catholyte reservoir 46 via catholyte supply and return lines 48, 50. Each cell 12 is charged by delivering electrical energy from the power source 64 to negative and positive electrodes 16, 20. The electrical energy derives divalent vanadium ions in the anolyte solution 22 and quinvalent vanadium ions in the catholyte solution 24.

Electricity is drawn from each cell 12 by closing load switch 70 and opening power source switch 68. This causes load 66, which is in electrical communication with negative and positive electrodes 16, 20 to withdraw electrical energy. Although not illustrated, a power conversion system may be incorporated to convert DC power to AC power as needed.

A number of control parameters influence the efficiency of the system 10. A key control parameter is the temperature of the anolyte and catholyte solutions 22, 24. The temperature is influenced by ambient conditions and load requirements. Another control parameter is the pressure of the solutions 22, 24 which is influenced by flow rates, state of charge (SOC), temperature, and plant design. A further control parameter is the flow rate which is controlled through variable speed drives. Other control parameters include charging current and duration of constant current periods, as determined by SOC.

Another control parameter is hydrogen evolution. The hydrogen evolution is minimized in the control strategy and is influenced by temperature, SOC, load and rates of charge and discharge which are ramp rates. Another control parameter is the remixing of concentrations of the anolyte and catholyte solutions 22, 24 with respect to volumes. Pressure differentials develop over time as reservoirs 28, 46 have different electrolyte levels due to crossover. Concentrations also vary and system optimization must factor the remixing parameter.

Recharge and discharge periods are additional control parameters. The rate of charge and discharge impact the evolution of hydrogen. In addition, during discharge, heat is developed and the temperature of the anolyte and catholyte solutions 22, 24 is raised. Viscosity is thus affected and pump flow rates need to be adjusted accordingly. The optimal time for charge and discharge is selected within the maximum rates that the system can handle as well as within the loads requirements, i.e. time available in a day.

Figure 2:
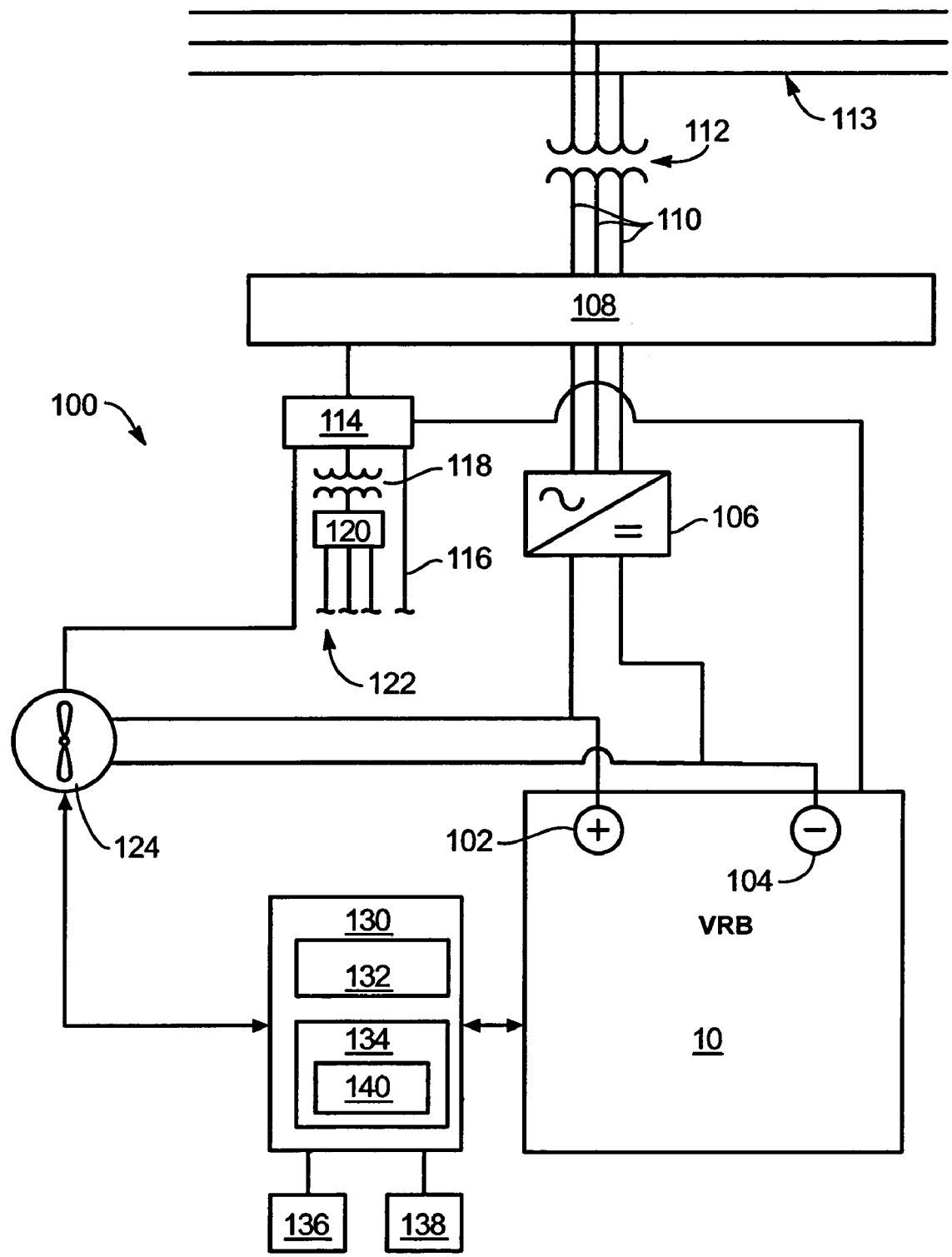
FIG. 2 is a block diagram illustrating a power generation system of the present invention.

Referring to FIG. 2, a block diagram illustrates a power generation system 100 of the present invention. The power generation system 100 may be used in either an on-grid application, where the system 100 is connected to a network of generator stations, or off-grid applications where the system 100 is isolated from other generator stations. One of skill in the art will appreciate that the power generation system 100 is for illustrative purposes only and other configurations, implementations, and techniques are within the scope of the invention.

The power generation system 100 includes a VRB 10 to provide DC power output to compensate power output from the system 100. The VRB 10 includes positive and negative terminals 102, 104 that are defined broadly to include electrical communication with the terminals of the individual cells 12. The terminals 102, 104 are in electrical communication with an inverter 106 to change DC power to three phase AC power. The inverter 106 may be coupled to a main switchboard 108 for local power distribution. The main switchboard 108 is in electrical communication with relays 110 for metering and protection, a step up transformer 112 to increase the voltage for remote distribution, and a three-phase distribution system 113 to enable long range power transmission.

A panel board 114 may be coupled to the main switchboard 112 for local power use. The panel board 114 is in electrical communication with the VRB 10 to power pumps 36, 54. One or more power lines 116 are in communication with the panel board 114 to provide high voltage supply to one or more applications, such as lighting, HVAC, and so forth. A transformer 118, in electrical communication with the panel board 114, steps down the voltage for wall outlets and delivers the voltage to a sub panel 120. The sub panel 120 is in electrical communication with one more wall outlets 122.

The power generation system 100 includes one or more DC wind turbine generator(s) 124 that are embodied as a permanent magnet machines. The turbine generators may also be selected from any number of known devices, such as induction generators, synchronous generators, and asynchronous generators. DC generators have the advantage of being smaller, lighter, and less expensive turbines than alternating current generators. DC generators have lower losses, have no reactive energy requirements from a grid, have less impact on the grid, and require less operation management maintenance.

The combination of one or more wind turbine generator(s) 124 with a VRB 10 reduces the variability in power output from a wind turbine or set of turbines in a wind farm configuration. The DC wind generator may be in direct communication with the VRB 10 and the rectifier 106 to provide DC power to the distribution system 113 or VRB 10. A direct communication is defined herein as not having a component or device interposed between. Alternatively, the DC wind generator may be in indirect electrical communication with the VRB 10.

The power generation system 100 further includes a controller 130 that is in electrical communication with the VRB 10 and the DC wind turbine generator 124 to control their respective operation. The controller 130 manages the performance of the VRB 10, and the wind turbine generator 124 in such a manner as to optimally meet the fundamental parameters of efficiency and safe operation. The controller 130 further provides self-protection in the event of an external or internal fault or failure of a critical component, provides accurate controlled output as determined by dynamic load requirements or preset performance thresholds, and provides ambient conditions prevailing from time to time in each cycle.

The controller 130 monitors the power output of the VRB 10 and the wind turbine generator 124. The controller 130 also monitors the charging and discharging times of the VRB 10. There are several key parameters that control the operation of a VRB 10. For any given concentration of electrolyte solution, the key parameters include ambient temperature, internal VRB cell temperatures, volumetric flow rates, pressure within and across the cells 12, and state of charge of the electrolyte and load as evidenced by the current drawn or supplied. The load may be seen as positive or negative. If negative, then the load is actually supplying power to the VRB 10. All of these parameters continuously change in a dynamic manner and vary with the age of the VRB 10.

The controller 130 may be embodied as a programmable logic computer including a processor 132 which may be a general purpose device, such as a 80.times.86, Pentium (mark of Intel), 680.times.0, or other "off-the-shelf" microprocessor. The processor 132 may include a special purpose processing device, such as an ASIC, PAL, PLA, PLD, Field Programmable Gate Array, or other customized or programmable device.

The processor 132 is in electrical communication with a memory 134 that receives and stores executable applications and data. The memory 134 may include static RAM, dynamic RAM, flash memory, ROM, CD-ROM, disk, tape, magnetic, optical, or other computer storage medium. The controller 130 includes an input device 136 and an output 138 to enable user interaction. The input device 136 may include a keyboard, mouse, touch screen, light pen, tablet, microphone, sensor, or other hardware with accompanying firmware and/or software. The output device 138 may include a monitor or other display, printer, speech or text synthesizer, switch, signal line, or other hardware with accompanying firmware and/or software.

The controller 130 includes a control module 140, resident in memory 154 that monitors and controls the power generation system 100. The control module 140 is an algorithmic application that evaluates the dynamic conditions of the system 100 by monitoring operational data indicative of the system states to enhance performance.

The DC generated power may be added to DC power from the VRB 10 and delivered to the distribution system 113. DC generated power may also be used to charge the VRB 10. The DC output allows the wind turbine generator 124 to operate independent of the frequency of the distribution system 113. This extends the operating range of the wind turbine generator 124. Furthermore, with direct current generators no power electronics to control speed and frequency are needed which greatly reduces cost. The cost of connection equipment to the distribution system 113 is also reduced.

The power generation system 100 provides a system power output with a constant voltage and constant frequency in an off-grid application. The control system 10 controls the system voltage and frequency by adjusting the VRB 10 power output. The control system 150 continuously monitors power output from the wind turbine generator. When wind turbine power declines, power output from the VRB 10 is increased to provide a constant system voltage. When wind turbine power increases, power output from the VRB 10 is decreased. The control system 150 further monitors the frequency of the system power and adjusts the active power generated by the VRB 10 to provide a constant frequency. The power generation system 100 incorporating a VRB 10 is able to respond instantaneously and generate a frequency with a sinusoidal waveform output.

In a similar manner, the power generation system 100 provides a constant voltage in an on-grid application. The controller monitors the power output of the wind turbine generator 124. The power output from the VRB 10 is increased or decreased accordingly to provide a constant voltage.

Figure 3:
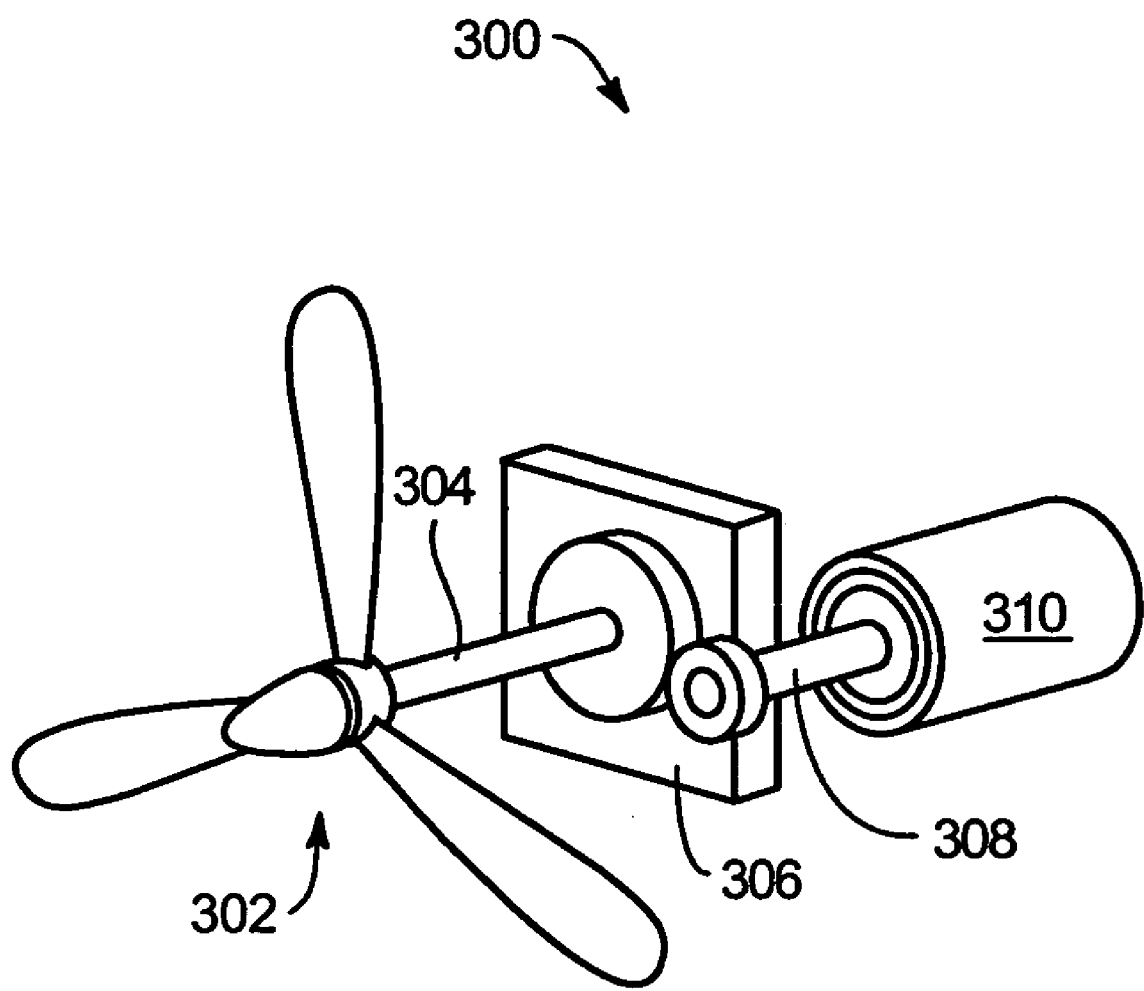
FIG. 3 is a block diagram of one embodiment of a wind turbine generator for use in the present invention.

Referring to FIG. 3, a DC wind turbine 300 is shown. The wind turbine generator 300 includes a turbine 302 that is connected to a main shaft 304. The turbine 302 and main shaft 304 may be horizontally or vertically configured. The main shaft 304 is coupled to a gearbox 306. The gearbox 306 converts slowly rotating, high torque power from the turbine 302 to high speed, low torque power. The gearbox 306 does not change gears and normally has a single gear ratio between the rotation of the turbine 302 and a generator.

The gearbox 306 is coupled to a gear shaft 308 which is coupled to a generator 310. The generator 310 may be embodied as an induction generator which enable wind speed capture at speeds lower than those necessary to create generation at the utility frequency. Induction generators also allow dynamic control over the generator voltage and frequency which allows for generator operation at maximum efficiency. The generator includes a rotor and a stator in proximity to the rotor. During operation, the interaction of the rotor and the stator produces a DC power output from the stator.

Figure 4:
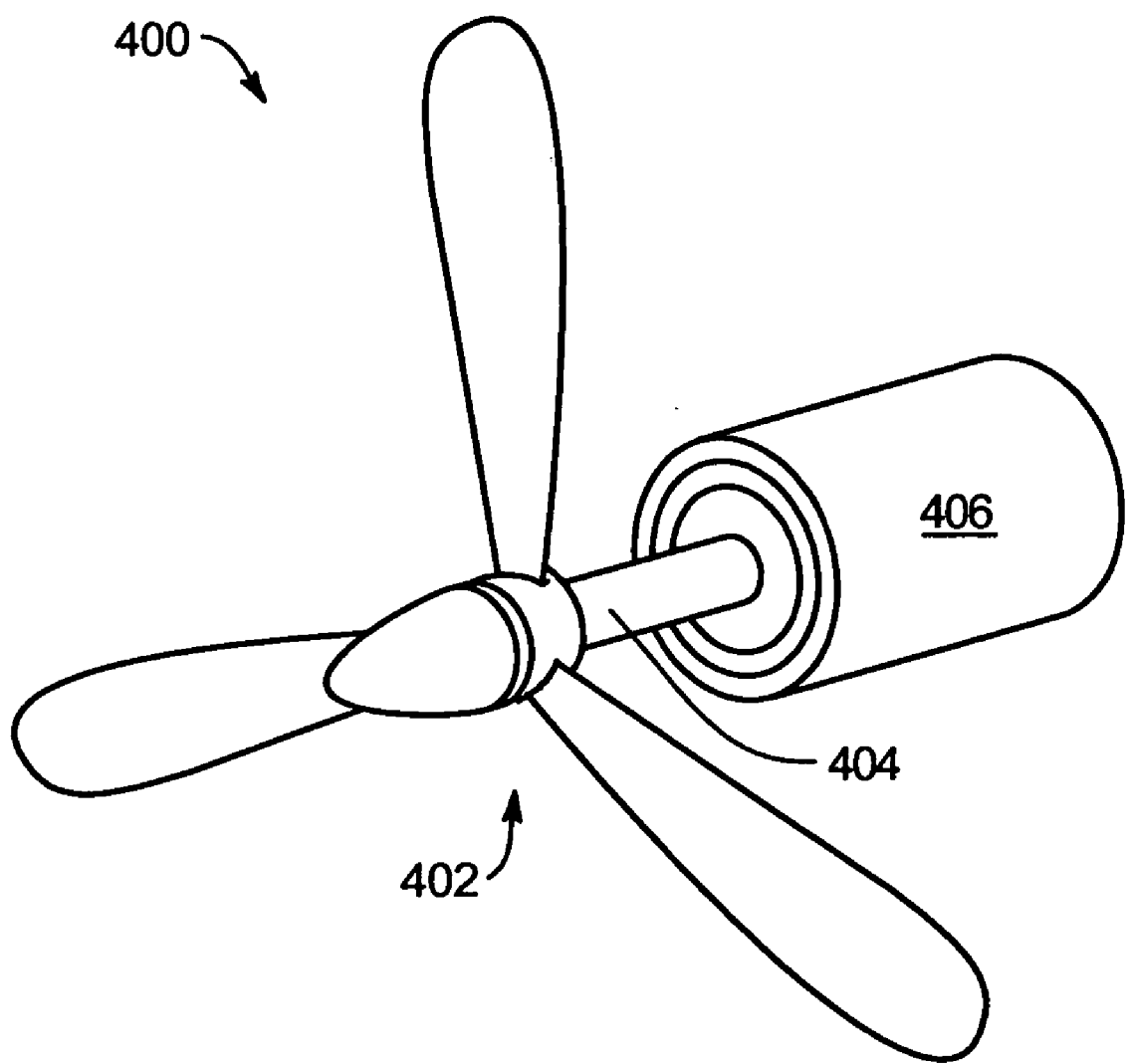
FIG. 4 is a block diagram of an alternative embodiment of a wind turbine generator for use in the present invention.

Referring to FIG. 4, an alternative embodiment of a wind turbine generator 400 suitable for use with the present invention is shown. The wind turbine generator 400 is similar to that of FIG. 3 but does not include a gearbox and relies on a direct drive. The turbine 402 couples directly to a synchronous generator 406 by a main shaft 404. A direct drive generator 406 has the disadvantage of insufficient rotation speed to generate sufficient power. In order to compensate, the generator 406 may include additional poles. The mass of the rotor is approximately proportional to the amount of torque it receives which increases rotor weight and increases the cost of the wind turbine generator. Nevertheless, a direct-drive configuration may be implemented in the present invention.

One of skill in the art will appreciate that the illustrated embodiments of wind turbine generators are for exemplary purposes only and should not be considered limiting of the present invention. Other induction generators may also be incorporated into the present invention, such as a variable reluctance generator.

A power generation system includes a wind turbine generator with a DC output to lower costs and enhance availability and efficiency. The power generation system provides efficient management of one or more wind power generators and a VRB to provide a high quality power output. A controller maintains system stability by monitoring power outputs and dynamically adjusting active and reactive power accordingly. The power generation system of the present invention improves the reliability, quality, and value of wind power.

It will be obvious to those having skill in the art that many changes may be made to the details of the above-described embodiments without departing from the underlying principles of the invention. The scope of the present invention should, therefore, be determined only by the following claims.

The invention claimed is:

1. A power generation system to generate and store power, comprising:
   a vanadium redox battery to absorb DC power and generate DC battery power;
   a DC wind turbine generator that does not use an alternating current device and in electrical communication with the vanadium redox battery to generate DC wind power; and
   a control system in electrical communication with the vanadium redox battery to control power absorption and generation and in electrical communication with the wind turbine generator to monitor wind power generation.

2. The power generation system of claim 1, wherein the DC wind turbine generator includes a gear shaft and a gearbox coupled to the gear shaft.

3. The power generation system of claim 1, wherein the DC wind turbine generator includes a synchronous generator.

4. The power generation system of claim 1, wherein the DC wind turbine generator includes an asynchronous generator.

5. The power generation system of claim 1, wherein the DC wind turbine generator includes a permanent magnet.

6. A power generation system to generate and store power, comprising:
   a vanadium redox battery to absorb DC power and generate DC battery power;
   a DC wind turbine generator that does not use an alternating current device and in direct electrical communication with the vanadium redox battery to generate DC wind power;
   an inverter in electrical communication with the vanadium redox battery and the wind turbine generator to convert DC wind power and DC battery power to AC power; and
   a control system in electrical communication with the vanadium redox battery to control power absorption and generation and in electrical communication with the wind turbine generator to monitor wind power generation.

7. The power generation system of claim 6, wherein the DC wind turbine generator includes a gear shaft and a gearbox coupled to the gear shaft.

8. The power generation system of claim 6, wherein the DC wind turbine generator includes a synchronous generator.

9. The power generation system of claim 6, wherein the DC wind turbine generator includes an asynchronous generator.

10. The power generation system of claim 6, wherein the DC wind turbine generator includes a permanent magnet.

11. A method for generating and storing power, comprising:
   providing a vanadium redox battery to absorb DC power and generate DC battery power;
   providing a DC wind turbine generator that does not use an alternating current device and in electrical communication with the vanadium redox battery to generate DC wind power;
   providing an inverter in electrical communication with the vanadium redox battery and the DC wind turbine generator to convert DC battery power and DC wind power to AC power;
   the vanadium redox battery receiving and absorbing DC wind power; and
   providing a control system in electrical communication with the vanadium redox battery to control power absorption and generation and in electrical communication with the wind turbine generator to monitor wind power generation.

12. The method of claim 11, wherein the DC wind turbine generator includes a gear shaft and a gearbox coupled to the gear shaft.

13. The method of claim 11, wherein the DC wind turbine generator includes a synchronous generator.

14. The method of claim 11, wherein the DC wind turbine generator includes an asynchronous generator.

15. The method of claim 11, wherein the DC wind turbine generator includes a permanent magnet.

* * * * *

UNITED STATES PATENT AND TRADEMARK OFFICE
CERTIFICATE OF CORRECTION

PATENT NO. : 7,265,456 B2
APPLICATION NO. : 11/035922
DATED : September 4, 2007
INVENTOR(S) : Timothy D. J. Hennessy It is certified that error appears in the above-identified patent and that said Letters Patent is hereby corrected as shown below:

Column 3, line 27, "...to 6M H.sub.2 SO.sub4 and..." change to -- to 6M $H_2$ SO.sub4 and --

Column 3, line 29, "...6M.sub.2 SO.sub.4." change to -- $6M_2 SO.sub.4$. --

Column 3, line 27, "...to 6M H.sub.2 SO.sub4 and..." change to -- to 6M H.sub.2 $SO_4$ and --

Column 3, line 29, "...6M.sub.2 SO.sub.4." change to -- 6M.sub.2 $SO.sub._4$.--

Column 3, line 54, "...return line vales 44 that.." change to -- return line vale 44 that --

Column 3, line 61, "...catholyte solution 22 through the ..." change to -- catholyte solution 24 through the --

Column 4, line 45, "...optimization must factor the remixing..." change to -- optimization must factor in the remixing --

Column 5, line 14, "...main switchboard 112 for local..." change to -- main switchboard 108 for local --

Column 5, line 25, "...are embodied as a permanent..." change to -- are embodied as permanent --

Column 5, line 39, "...and the rectifier 106 to provide..." change to -- and the inverter 106 to provide --

Column 6, line 7-8, "...as a 80.times.86, Pentium (mark of Intel), 680.times.0, or other..." change to -- as a 80x.86, Pentium (mark of Intel), 680x0, or other --

Column 6, line 18, "...and an output 138 to ..." change to -- and an output device 138 to --

Column 6, line 27, "...in memory 154 that monitors..." change to -- in memory 134 that monitors --

UNITED STATES PATENT AND TRADEMARK OFFICE
CERTIFICATE OF CORRECTION

PATENT NO. : 7,265,456 B2
APPLICATION NO. : 11/035922
DATED : September 4, 2007
INVENTOR(S) : Timothy D. J. Hennessy It is certified that error appears in the above-identified patent and that said Letters Patent is hereby corrected as shown below:

Column 7, line 8, "...generator which enable wind speed ..." change to -- generator which enables wind speed --

Signed and Sealed this

Twenty-fifth Day of March, 2008

JON W. DUDAS
*Director of the United States Patent and Trademark Office*